(12) United States Patent
Cheshire

(10) Patent No.: US 7,876,677 B2
(45) Date of Patent: Jan. 25, 2011

(54) TRANSMISSION CONTROL PROTOCOL QUEUE SORTING

(75) Inventor: Stuart D. Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 331 days.

(21) Appl. No.: 11/805,503

(22) Filed: May 22, 2007

(65) Prior Publication Data

US 2008/0291937 A1    Nov. 27, 2008

(51) Int. Cl.
*G01R 31/08* (2006.01)
(52) U.S. Cl. .................. 370/230.1; 370/235
(58) Field of Classification Search ............ None
See application file for complete search history.

(56) References Cited

U.S. PATENT DOCUMENTS

| 7,418,523 | B2 * | 8/2008 | Pettyjohn et al. | 709/250 |
| 7,477,644 | B2 * | 1/2009 | Georgiou et al. | 370/394 |
| 2004/0105393 | A1 * | 6/2004 | Ronneke et al. | 370/252 |
| 2004/0130552 | A1 * | 7/2004 | Duluk et al. | 345/506 |

* cited by examiner

*Primary Examiner*—Pankaj Kumar
*Assistant Examiner*—Eunsook Choi
(74) *Attorney, Agent, or Firm*—Park, Vaughn, Fleming & Dowler LLP; Steven E. Stupp

(57) ABSTRACT

A device that queues and transmits data packets is described. This device includes: a queue configured to store data packets awaiting transmission; a controller configured to dynamically determine an order in which the data packets are transmitted from the queue; and a transmission mechanism configured to transmit the data packets from the queue in the determined order. The transmission order is determined using Transmission Control Protocol (TCP) sequence numbers and/or TCP timestamps contained in the data packets in the queue in order to provide increased utility without reducing existing fairness between independent data streams.

20 Claims, 7 Drawing Sheets

QUEUE 500

QUEUE 530

TRANSMISSION CONTROL PROTOCOL QUEUE SORTING

BACKGROUND

1. Field of the Invention

The present invention relates to techniques for managing data flow in communication systems. More specifically, the present invention relates to a technique for reordering data packets in a queue to provide increased utility without reducing existing fairness between independent data streams.

2. Related Art

The recent proliferation of communication systems and networks, and the associated advances in networking technology, are enabling a wide variety of new services and applications. For example, users are now able to view time-based media (such as audio and/or video) that is streamed in real-time over communication networks. However, many of these communication networks are lossy. This is particularly the case in those networks that implement increasingly popular consumer-networking technologies, such as the Internet. In these communication networks, information in the form of data packets may be lost during transmission. As a consequence, data packets may need to be retransmitted to ensure proper reception. Furthermore, even if data packets are not lost during transmission, the data packets may arrive in a different order than their original sequential order.

Delivering data packets out of order can have a detrimental effect on the performance of communication protocols. Communication protocols such as Transmission Control Protocol (TCP) achieve high performance by having multiple data packets in flight at the same time. For example, it is not uncommon for a TCP connection to have as many as 40 unacknowledged data packets outstanding at any one time. As the first of these data packets arrive at the receiver and are acknowledged, the sender transmits more data packets to maintain a pipeline of data packets in flight. If a single data packet is lost, the sender's TCP stack will promptly retransmit the lost data packet, but in a first-come-first-served network, this retransmitted data packet will be stuck in a long queue behind 40 other data packets. Thus, while the retransmitted data packet is conceptually ahead of the other 40 data packets from the perspective of TCP, it is chronologically behind these other data packets from the network-hardware perspective.

Because of the way TCP is designed, the sender's TCP stack cannot usefully deliver out-of-order data to the client. As a result, it has to save those 40 other data packets in buffers until the waited-for retransmitted data packet arrives to fill the gap in the sequence, and then the entire contiguous batch of data can be delivered to the client. Furthermore, even though a relatively steady stream of inbound data packets was received at the IP layer, from the client's point of view the data arrival rate is erratic and bursty. For example, sometimes no data is delivered for a long time (in computer terms, perhaps a whole second), and then a large burst of data is delivered all at once.

With time-based media, like audio or video, this bursty delivery is undesirable. Even though the lost data packet was retransmitted promptly by TCP, the retransmitted data packet was stuck at the back of a long queue, and by the time it finally arrives, the receiver may have already passed the time when that media was supposed to be played, resulting in audio dropouts and visual glitches. Because such audio dropouts and visual glitches are unacceptable, the receiver has to be engineered to withstand such delays, for example, by using larger playback buffers to absorb the variability. These larger playback buffers increase the cost of the device, and decrease the responsiveness of the user interface because it takes longer to fill these larger playback buffers.

Even for non-time-based data, such as a simple file transfer, having retransmitted data packets stuck at the back of a long queue is undesirable. For example, the amount of unacknowledged TCP data that a sender can have outstanding at any time is limited by the 'receive window' offered by the receiver. When a data packet is lost, all subsequent data packets take up space in that receive window, and when the entire receive window is consumed, the sender is prohibited from sending any more data until the awaited retransmitted data packet is received and acknowledged by the receiver. These pauses that are imposed on the sender result in lower overall aggregate throughput. This means that even for non-time-based data, having retransmitted data packets stuck at the back of a long queue can result in reduced throughput.

Furthermore, regardless of whether data is time-based or not, bursty delivery is undesirable for other reasons too. For example, during the times that the TCP stack delivers no data to the client, system resources like the CPU, memory bandwidth, and disk bandwidth may be under-utilized. Then, when a large burst of data is delivered, those system resources are suddenly over-taxed until the large burst of data has been processed. Suppose for example that the limiting factor in a file transfer is the speed data can be written to a hard disk drive. When a data packet is lost and the receiver's TCP stack stops delivering data while it waits for a retransmission of the lost data packet, the disk drive may complete all its outstanding writes and go idle. Then, when the retransmitted data packet arrives and the large burst of data is delivered, the disk drive will again become the bottleneck and the rate the client can accept the large burst of data from the TCP stack will be limited by how fast the disk drive can write the data. Consequently, each time the disk drive is allowed to go idle will be reflected as additional delays in the total time it takes to complete the entire file transfer. Therefore, smooth steady delivery of data is better than erratic or bursty delivery of data.

Several alternative communication protocols have been proposed to address these challenges. However, many of these protocols are complicated and expensive. Furthermore, these communication protocols may not be backwards compatible and may introduce new problems. For example, some existing communication protocols mark retransmitted data packets for special handling using a high-priority flag. Unfortunately, implementing high-priority flags requires coordination across multiple layers of software and between multiple components in the communication network. In addition, it is hard to prevent abuse of such a mechanism. As a consequence, high-priority flags may lead to fairness problems because users may 'game' the system to ensure that their data packets receive higher priority.

Hence what is needed is a method and an apparatus that facilitates the management of data flow in communication systems without the above-described problems.

SUMMARY

One embodiment of the present invention provides a device that queues and transmits data packets. This device includes: a queue configured to store data packets awaiting transmission; a controller configured to dynamically determine an order in which the data packets are transmitted from the queue; and a transmission mechanism configured to transmit the data packets from the queue in the determined order. The transmission order is determined using Transmission Control Protocol (TCP) sequence numbers and/or TCP timestamps contained in the data packets in the queue.

In some embodiments, the controller is configured to use the TCP sequence numbers and/or TCP timestamps to ensure that when a data packet is removed from the queue in preparation for transmission, if other data packets belonging to the same TCP connection are also in the queue, the data packet selected for transmission is the data packet earliest in sequence belonging to the TCP connection.

Furthermore, the controller may be configured to maintain relative fairness between different TCP connections. For example, the controller may restrict data packet reordering to be performed only with respect to other data packets belonging to the same TCP connection. In this way, for any given set of data packets in the queue awaiting transmission, the order in which associated TCP connections will each transmit data packets remains unchanged. In addition, as each TCP connection gets its 'turn' to have a data packet sent, the data packet selected for transmission, from the data packets for the given TCP connection currently waiting in the queue, is the data packet that is earliest in the sequence for the given TCP connection.

In some embodiments, while removing the data packet from the head of the queue in preparation for transmission, the controller is configured to search the queue for the data packet earliest in sequence (as determined by the TCP sequence numbers and/or timestamps) belonging to the same TCP connection as the data packet at the head of the queue. Then, if the data packet earliest in sequence is not the data packet currently at the head of the queue, the controller swaps the data packet at the head of the queue with the earliest data packet. As a result of this operation, as one data packet is moved forward in the queue by some distance, another data packet from the same TCP connection is moved back by the same amount, thereby preserving the relative fairness between different TCP connections. Next, having selected the optimal data packet for transmission, the controller then proceeds with subsequent processing of that data packet (for example, the controller may remove the data packet from the head of the queue and cause it to be transmitted).

Note that searching the queue may involve searching a linked list, a hash table, a heap, or other data structure so that the search is performed more efficiently than a simple linear search. Also note that swapping the data packet at the head of the queue with the earliest data packet may be a conceptual swap rather than a literal swap, for example, the swap may involve modifying pointers associated these data packets rather than copying the actual data associated with the data packet en masse.

In some embodiments, when a new data packet is to be inserted into the queue, the controller is configured to place the new data packet at the tail end of the queue, or as otherwise dictated by a queuing policy that is presently in effect. This new data packet becomes the initial 'comparison data packet' used in the technique described below. Then, the controller is configured to search the queue, starting at the head, in order of expected transmission, and to examine each waiting data packet that belongs to the same TCP connection as the comparison data packet. If another data packet is found that belongs to the same TCP connection as the comparison data packet but which falls later in the sequence compared to the comparison data packet, the controller is configured to swap the data packet and the comparison data packet so that the data packet that falls later in the sequence now becomes the new comparison data packet, and the old comparison packet takes the data packet's place in the queue. Next, the controller is configured to continue searching from the current position in the queue. After every data packet belonging to the same TCP connection as the comparison data packet has been examined, the insertion of the new data packet into the queue is complete. Note that the data packet can be a newly transmitted packet or a retransmission of a previously dropped data packet.

In some embodiments, the data packets in the queue are further reordered based on active queue management. For example, the data packets in the queue may be reordered based on weighted-fair queuing, queue reservations, and/or queue priority flags.

In some embodiments, the process of dynamically determining the processing order of the data packets in the queue is performed recursively.

Another embodiment provides a method for queuing and transmitting data packets. During the method, a device queues data packets awaiting transmission. Then, the device dynamically determines the order in which the data packets are transmitted from the queue using TCP sequence numbers and/or TCP timestamps contained in the data packets in the queue. Next, the device transmits data packets from the queue in the determined order.

Another embodiment provides a computer program product for use in conjunction with a computer system.

BRIEF DESCRIPTION OF THE FIGURES

Note that like reference numerals refer to corresponding parts throughout the drawings.

DETAILED DESCRIPTION

Figure 1:
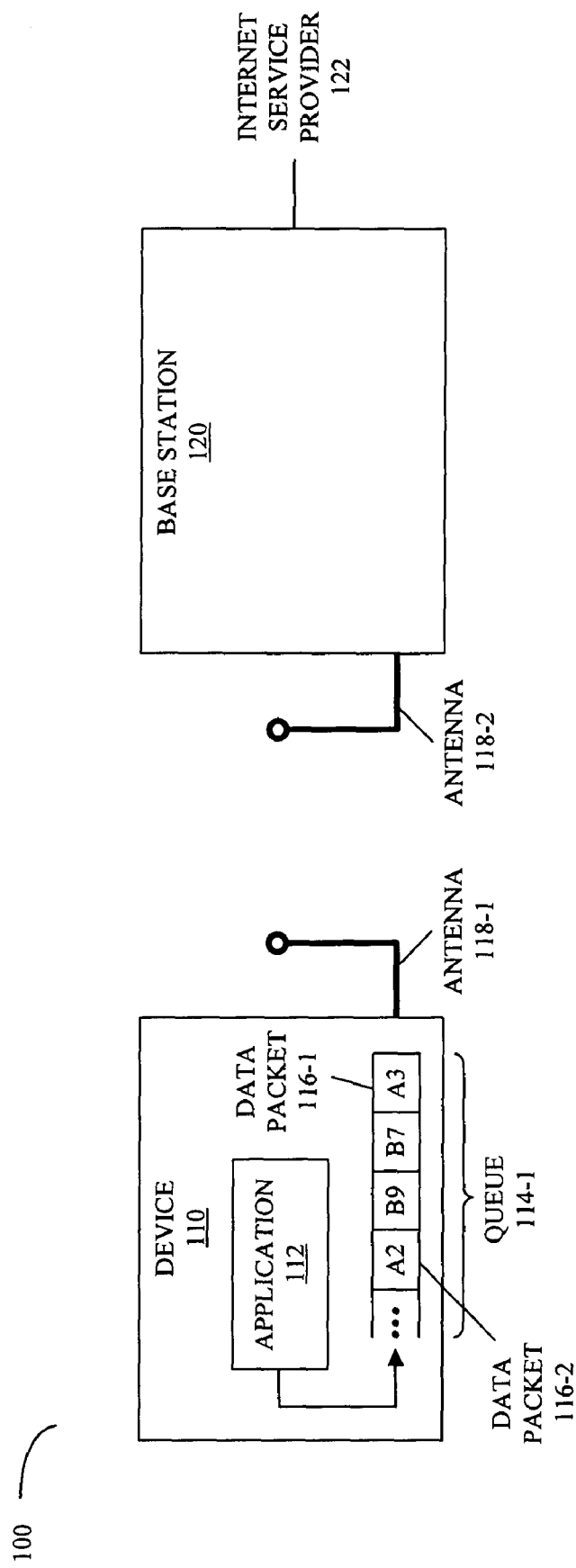
FIG. 1 is a block diagram illustrating a communication system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a device, a computer system, a method, and a computer program product (i.e., software) for use with the device and/or the computer system are described. These devices, systems, and/or processes may be used to queue and transmit data packets in a communication system or network. In particular, the order in which data packets are transmitted from the queue may be dynamically determined using Transmission Control Protocol (TCP) sequence numbers and/or TCP timestamps contained in the data packets in the queue. The order may be determined when a data packet is removed from the queue in preparation for transmission and/or when a new data packet is inserted into the queue. Note that a new data packet may be a retransmitted data packet, and this is the case that most commonly results in data packets arriving in the queue not in their natural sequence order.

In some embodiments, the determined order may ensure that, when a data packet is removed from the queue, it is the earliest data packet in the queue associated with a specific TCP connection.

Furthermore, the reordering of data packets may be restricted to operate only with respect to other data packets belonging to the same TCP connection, thereby insulating other TCP connections from the effects of the reordering and maintaining relative fairness between different TCP connections. For example, in one embodiment of the present invention, for any given set of data packets in the queue awaiting transmission, the order in which associated TCP connections will each transmit data packets remains unchanged.

Note that the reordering may use a linear or sequential search-and-swap technique of data packets belonging to the same TCP connection in the queue. However, in other embodiments a linked list, a hash table, a heap, and/or one or more other data structures may be used to accelerate the search. Furthermore, in some embodiments the reordering involves modifying pointers associated the data packets for the same TCP connection. And in some embodiments, the queue-sorting technique may be combined with other active-queue-management techniques, such as weighted-fair queuing, queue reservations, and/or queue priority flags.

The data packets may be received and/or transmitted over a variety of communication networks, such as the Internet, an Intranet, a wired local area network (LAN) (such as IEEE 802.3 or Ethernet), a wireless local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology that enables communication between computing systems or electronic devices.

Furthermore, while following discussion uses TCP as an illustrative example, the queue-sorting technique may be implemented using other communication protocols that include sequence information. Note that the data packets may be encrypted and/or compressed.

We now describe embodiments of a device and a communication system for queuing and transmitting data packets. FIG. 1 presents a block diagram illustrating a communication system 100 in accordance with an embodiment of the present invention. In communication system 100, a device 110 (such as a wireless card and/or a modem) forwards data packets associated with an application 112. Note that in some embodiments the application 112 provides streamed time-based audio and/or video (for example, television). However, in other embodiments the data packets may include data that is not time-based, such as a simple file transfer.

In the device 110, data packets for one or more communication connections or data streams are queued in queue 114-1 for subsequent transmission using antenna 118-1. Note that data packets 116 belong to the same connection. In some embodiments, this connection may be a TCP connection, characterized by a source IP address, a destination IP address, a source TCP port, a destination TCP port, and a protocol identifier (i.e., in this case TCP). Furthermore, in some embodiments queue 114-1 is a memory buffer, such as a first-in first-out (FIFO) memory. Note that the queue 114-1 may be implemented in software and/or hardware in the device 110.

As described further below, a queue-sorting technique is applied in the queue 114-1 when a new data packet (such as data packet 116-2) is to be added to the queue 114-1 and/or when a data packet (such as data packet 116-1) is to be removed from a head of the queue 114-1 in preparation for transmission. For a given connection, this technique may ensure that the data packets in the queue 114-1 are transmitted in the correct sequential order. For example, using this technique the data packet 116-1 at the head of the queue 114-1 for the given connection is not the earliest data packet in the sequence of data packets 116 that are in the queue 114-1 for this connection, and data packet 116-1 should be swapped with data packet 116-2 so that data packet 116-2 is transmitted first. Note that in an exemplary embodiment the re-ordering is dynamically determined based on TCP sequence numbers and/or TCP timestamps in the data packets 116 for the given connection in the queue 114-1.

Furthermore, in some embodiments the re-ordering of the data packets 116 is implemented without penalizing other traffic (i.e., independent data streams) in the queue 114-1. In particular, for any given set of data packets in the queue 114-1 awaiting transmission, the order in which associated connections will each transmit data packets may remain unchanged. Thus, the re-ordering may be applied to data packets belonging to the given connection, such as the data packets 116. Furthermore, the ordering of data packets for a given connection may be determined independently from other connections.

Therefore, note that fairness is maintained by the above-described queue-sorting technique. As a result of this 'fairness' there is no benefit to be gained by intentional 'gaming' of the system in which a user attempts to have certain data packets processed with higher priority relative to other users' data packets. If allowed, such abuse may enable users to obtain an unfair share of network bandwidth or other resources in the communication system 100, and vulnerability to such abuse would limit the environments where the queue sorting technique could be used. However, under the above-described queue-sorting technique, if anyone use some trick with TCP sequence numbers to jump one of their data packets ahead in queue 114-1, the only data packets that would suffer as a result would be one of their own data packets from the same connection. In some embodiments, this intrinsic immunity from abuse makes this queue-sorting technique widely applicable.

Note that the new data packet 116-2 in the queue 114-1 may be a retransmitted data packet. However, note that this data packet may not be accorded special handling in the queue-sorting technique. Instead of using a high-priority flag for such retransmitted data packets, the queue-sorting technique may determine the correct sequential order of the data packets 116 in the queue 114-1 independently of whether or not these data packets are retransmitted.

This queue-sorting technique leverages the insight that there is no genuine scenario in which sending TCP data packets out of order is better than sending those same packets in sequential order. This general condition also happens to yield the desired handling of retransmissions: namely that they are brought forward to their correct place in the queue, consistent with their relative position in sequence with respect to other waiting data packets belonging to the same connection.

In one embodiment of the present invention, the queue-sorting technique ensures that earlier data packets in sequence (such as retransmitted data packets) are transmitted before other data packets for the same connection in the queue 114-1. Note that this approach balances the needs of a receiving device associated with this connection (which may be waiting for the retransmitted data packets) with the complexity of the communication system 100 and the risk of abuse. As a consequence, the queue-sorting technique may be implemented in the device 110 in a backwards-compatible fashion. This attribute may also encourage adoption of the queue-sorting technique.

Data packets may be transmitted from the device 110 to other devices, such as base station 120, via a communication channel (which may be wireless, optical, and/or wired). For example, these data packets may be received using an antenna 118-2.

Communication system 100 illustrates communication between the device 110 and the base station 120. Thus, in some embodiments the source of the data and the ultimate recipient may communicate directly over a single data link. However, in other embodiments the data packets traverse multiple network hops between source and destination. In either case, queue sorting may be usefully performed at some or all of the hops along the path. Furthermore, while the queue 114-1 is illustrated with data packets from multiple logical connections, the queue-sorting technique may be applied and may yield useful benefit even when there is only one logical connection.

Note that in some embodiments the communication system 100 includes fewer or additional components, two or more components are combined into a single component, and/or a position of one or more components may be changed.

Figure 2:
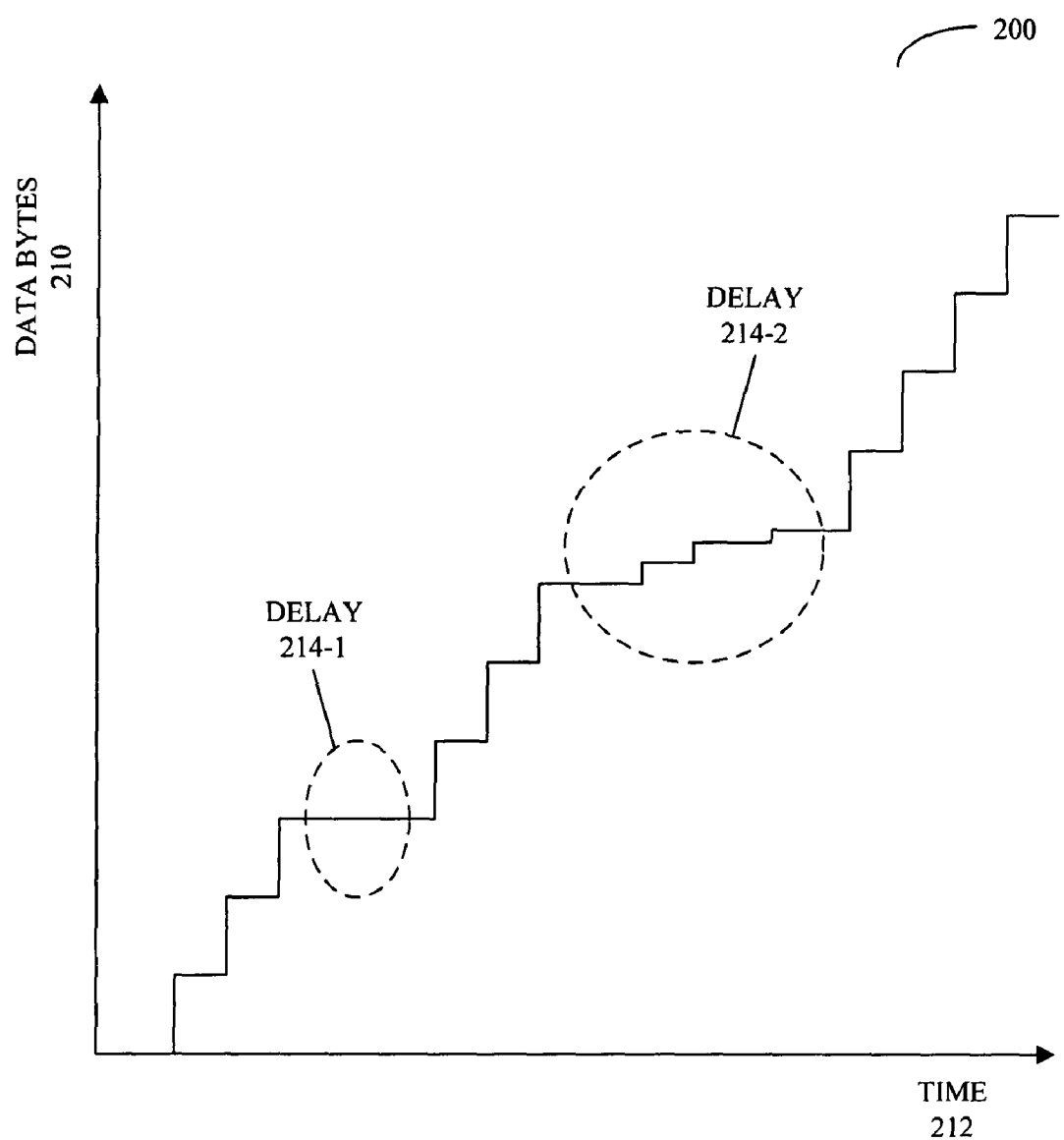
FIG. 2 is a graph illustrating transmitted data bytes as a function of time in accordance with an embodiment of the present invention.

FIG. 2 presents a graph illustrating transmitted data bytes 210 as a function 212 of time in accordance with an embodiment 200 of the present invention. For example, the data bytes 210 may be communicated between the device 110 (FIG. 1) and the base station 120 (FIG. 1). Embodiment 200 also illustrates delays 214 during which the data rate is significantly reduced. These delays may occur when data packets (such as the data packets 116 in FIG. 1) are received out of order or when one or more data packets are lost during transmission.

In particular, for streaming media the receiver may not be able to do anything useful with data packets it has already received until it receives any missing data packets and/or processes the data packets in correct order. The embodiments of the present queue-sorting technique address this problem, and may reduce and/or eliminate the delays 214.

Figure 3:
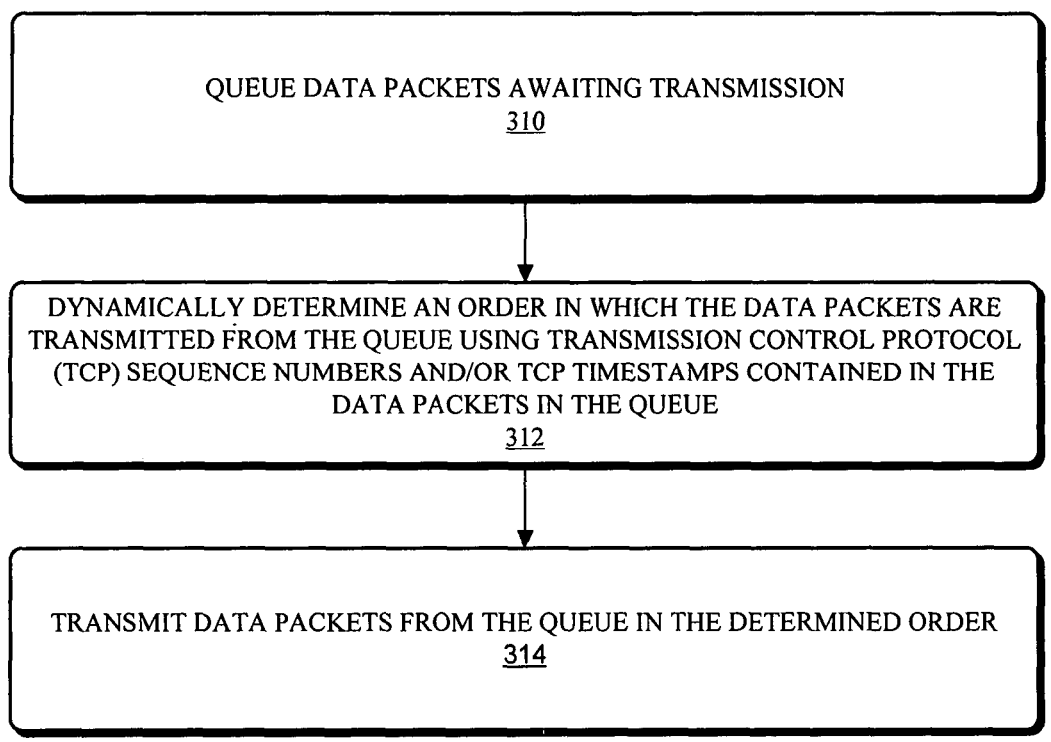
FIG. 3 is a flow chart illustrating a process for queuing and transmitting data packets in accordance with an embodiment of the present invention.

We now discuss methods for queuing and transmitting data packets. FIG. 3 presents a flow chart illustrating a process 300 for queuing and transmitting data packets in accordance with an embodiment of the present invention. During this process, a device (such as the device 110 in FIG. 1) queues data packets awaiting transmission (310). Then, the device dynamically determines an order in which the data packets are transmitted from the queue using TCP sequence numbers and/or TCP timestamps contained in the data packets in the queue (312). For example, if both data packets contain TCP timestamps, the TCP timestamps are compared to determine the relative ordering of the data packets. If one or both data packets lack a TCP timestamp, or if the TCP timestamps are equal, then the TCP sequence numbers are compared using a modular (cyclic) comparison to determine the relative ordering. Next, the device transmits the data packets in the determined order (314).

Figure 4:
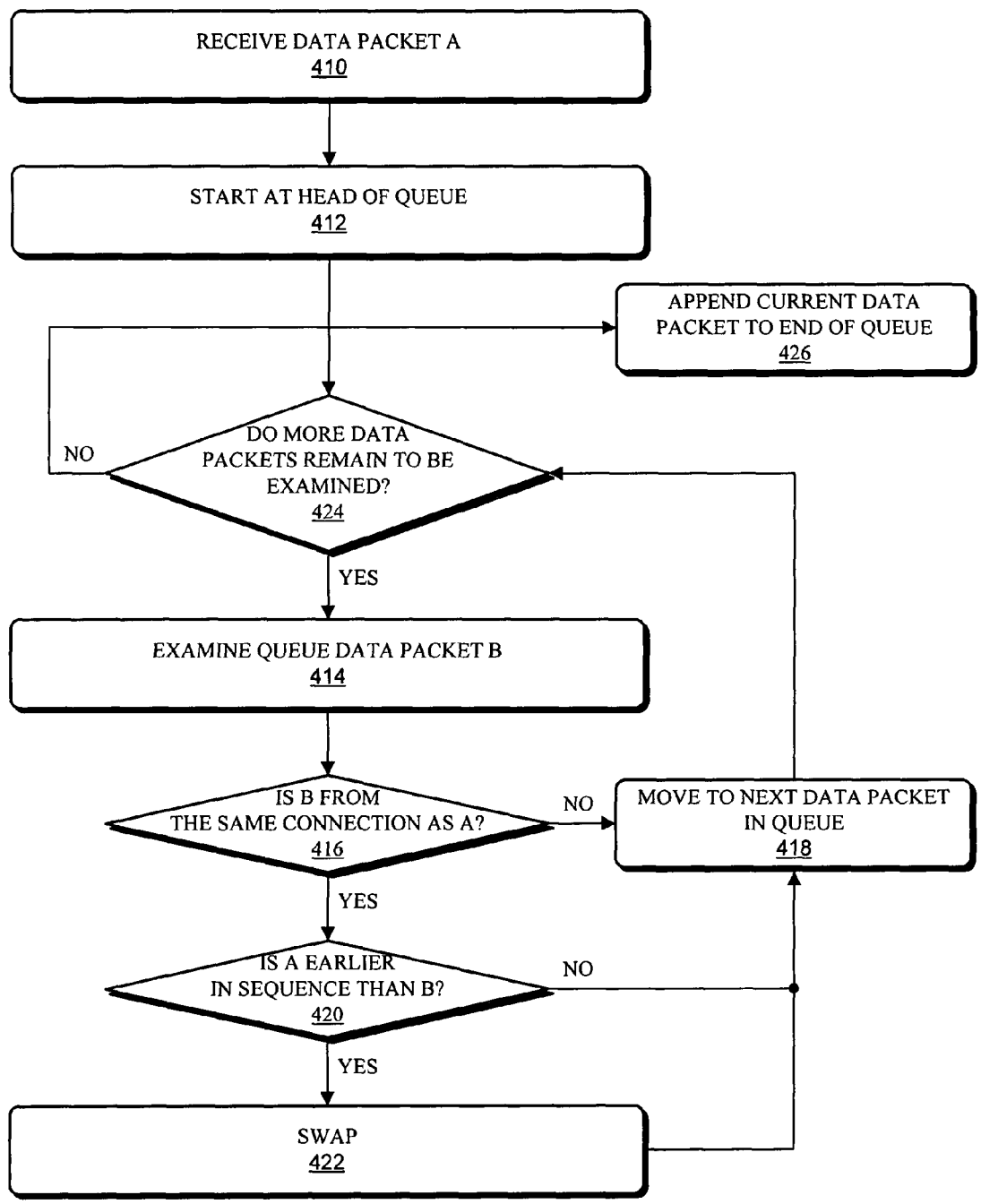
FIG. 4 is a flow chart illustrating a process for reordering data packets in accordance with an embodiment of the present invention.

FIG. 4 presents a flow chart illustrating a process 400 for reordering data packets in accordance with an embodiment of the present invention. During this process, a device (such as the device 110 in FIG. 1) receives data packet A (410). This is a data packet that is to be added to or inserted in a queue (such as the queue 114-1 in FIG. 1). A search of the other data packets in the queue is performed using data packet A as a so-called 'comparison data packet.' If there are no data packets in the queue or no data packets remain to be examined, this comparison data packet (i.e., the current data packet) is added to the end of the queue (426). However, if more data packets remain to be examined in the queue (424), this search is performed starting from the head of the queue (412).

During the search, the device examines data packet B in the queue (414). If data packet B is not from the same connection as data packet A (416) then the next data packet in the queue is considered (418). However, if data packet B is from the same connection as data packet A (416) then a determination is made as to whether or not data packet A is earlier in sequence than data packet B (420). Note that the relative positions of the data packets in the sequence may be determined using TCP sequence numbers and/or TCP timestamps.

If data packet A is later in the sequence than data packet B then the next data packet in the queue is considered (418). However, if data packet A is earlier in the sequence than data packet B then the device swaps the positions of data packet A and data packet B in the queue (422), and data packet B is used when the next data packet in the queue is considered (418), i.e., data packet B becomes the new comparison data packet.

This process is continued until all of the data packets in the queue or all the data packets associated with a given connection in the queue have been examined (424), and then the current comparison data packet (which may be the new data packet A, or some other data packet if swaps have been made) takes its place at the tail end of the queue (426), and the operation of inserting the new data packet A into its rightful place in the queue is complete. Note that this process ensures that the data packets for the given connection are output from the queue in sequential order.

Note that in some embodiments of the processes 300 and/or 400 there may be additional or fewer operations, the order of the operations may be changed, and two or more operations may be combined into a single operation. For example, in some embodiments the searching of the queue is performed from back to front or at an arbitrary position in the queue. In other embodiments, a random or pseudo-random path through the queue is used.

Figure 5A:
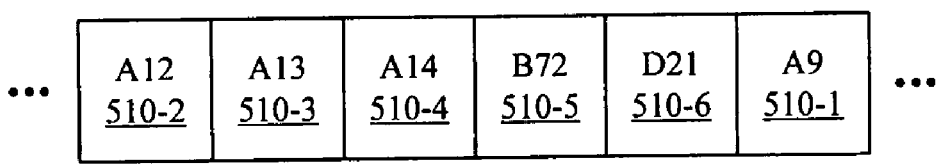
FIG. 5A is a block diagram illustrating a queue in accordance with an embodiment of the present invention.
Figure 5B:
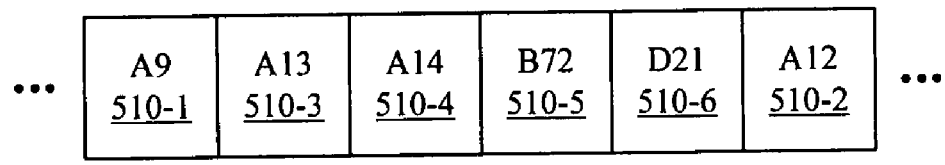
FIG. 5B is a block diagram illustrating a queue in accordance with an embodiment of the present invention.

Another illustration of the queue-sorting technique is shown in FIGS. 5A and 5B, which presents queues 500 and 530 (before and after reordering of data packets 510) in accordance with an embodiment of the present invention. Before transmitting packet A12 510-2 from the head of the queue, the queue is searched for other data packets belonging to the same connection that are earlier in sequence for that connection. Data packet A9 510-1 is discovered (possibly a retransmission of a lost data packet) which belongs to the same connection and is earliest in sequence of all the available data packets belonging to that connection, so data packets A9 510-1 and A12 510-2 are swapped, and then data packet A9 510-1 is transmitted from the head of the queue.

In some embodiments, such as those where the queue 500 is large, data structures may be used to accelerate the search through the queue 500. For example, rather than examining each of the data packets in the queue 500, only the data packets associated with the given connection may be examined. In some embodiments, such a focused search may be implemented using a linked list, a hash table, a heap, and/or one or more other data structures.

In some embodiments, the swapping or reordering involves modifying pointers associated with the data packets for the same TCP connection in the queue 500. However, in other embodiments the sorting may not be performed in memory. Instead, preferences associated the data packets may be modified, thereby changing the order in which these data packets are processed.

Furthermore, in some embodiments the queue-sorting technique may be combined with other active-queue-management techniques, such as weighted-fair queuing, queue reservations, and/or queue priority flags.

Note that in some embodiments the queues 500 and/or 530 include fewer or additional components, two or more components are combined into a single component, and/or a position of one or more components may be changed.

Figure 6:
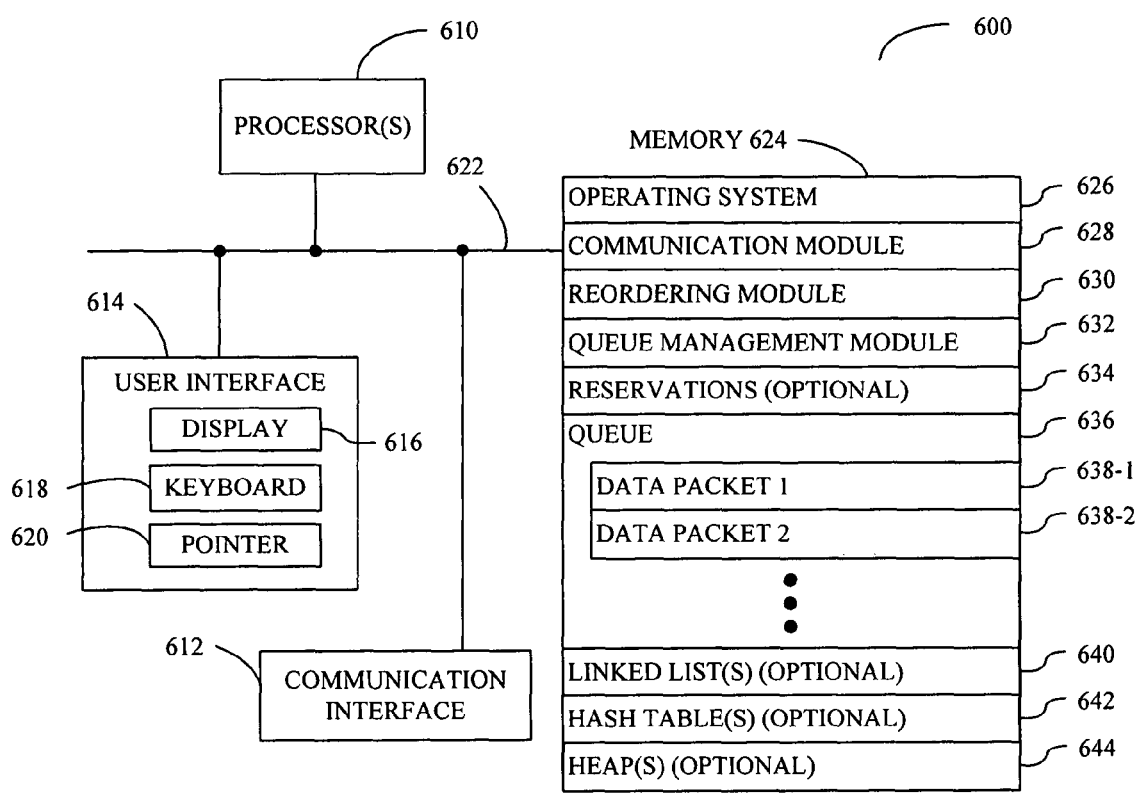
FIG. 6 is a block diagram illustrating a computer system in accordance with an embodiment of the present invention.

In high-data rate applications, the queue-sorting technique may be implemented at a low-level in a computer system using dedicated hardware, such as an Application Specific Integrated Circuit or a state machine. However, in other embodiments the queue-sorting technique is implemented at a high-level in computer system, for example, using software instructions that are executed by one or more microprocessors. This is shown in FIG. 6, which presents a block diagram illustrating a computer system 600 in accordance with an embodiment of the present invention. The computer system 600 includes one or more processors 610, a communication interface 612, a user interface 614, and one or more signal lines 622 coupling these components together. Note that the one or more processing units 610 may support parallel processing and/or multi-threaded operation, the communication interface 612 may have a persistent communication connection, and the one or more signal lines 622 may constitute a communication bus. Moreover, the user interface 614 may include a display 616, a keyboard 618, and/or a pointer 620, such as a mouse.

Memory 624 in the computer system 600 may include volatile memory and/or non-volatile memory. More specifically, memory 624 may include ROM, RAM, EPROM, EEPROM, FLASH, one or more smart cards, one or more magnetic disc storage devices, and/or one or more optical storage devices. Memory 624 may store an operating system 626 that includes procedures (or a set of instructions) for handling various basic system services for performing hardware dependent tasks. The memory 624 may also store procedures (or a set of instructions) in a communication module 628. The communication procedures may be used for communicating with one or more computers and/or servers, including computers and/or servers that are remotely located with respect to the computer system 600.

Memory 624 may also include multiple program modules (or a set of instructions), including reordering module 630 (or a set of instructions), queue-management module 632 (or a set of instructions), and optional reservations module 634 (or a set of instructions). Note that queue-management module 632 may implement active-queue management, and reservations module 634 may process priority flags associated with data packets in some embodiments.

Furthermore, memory 624 may include queue 636 including data packets 638. In some embodiments, memory 624 includes one or more optional linked lists 640, one or more optional hash tables 642, and/or one or more optional heap 644. These data structures may be used to implement searches through the data packets 638 for a given connection in the queue 636.

Instructions in the various modules in the memory 624 may be implemented in a high-level procedural language, an object-oriented programming language, and/or in an assembly or machine language. The programming language may be compiled or interpreted, i.e, configurable or configured to be executed by the one or more processing units 610.

Although the computer system 600 is illustrated as having a number of discrete components, FIG. 6 is intended to be a functional description of the various features that may be present in the computer system 600 rather than as a structural schematic of the embodiments described herein. In practice, and as recognized by those of ordinary skill in the art, the functions of the computer system 600 may be distributed over a large number of servers or computers, with various groups of the servers or computers performing particular subsets of the functions. In some embodiments, some or all of the functionality of the computer system 600 may be implemented in one or more ASICs and/or one or more digital signal processors DSPs.

The computer system 600 may include fewer components or additional components, two or more components may be combined into a single component, and/or a position of one or more components may be changed. In some embodiments the functionality of the computer system 600 may be implemented more in hardware and less in software, or less in hardware and more in software, as is known in the art.

Figure 7:
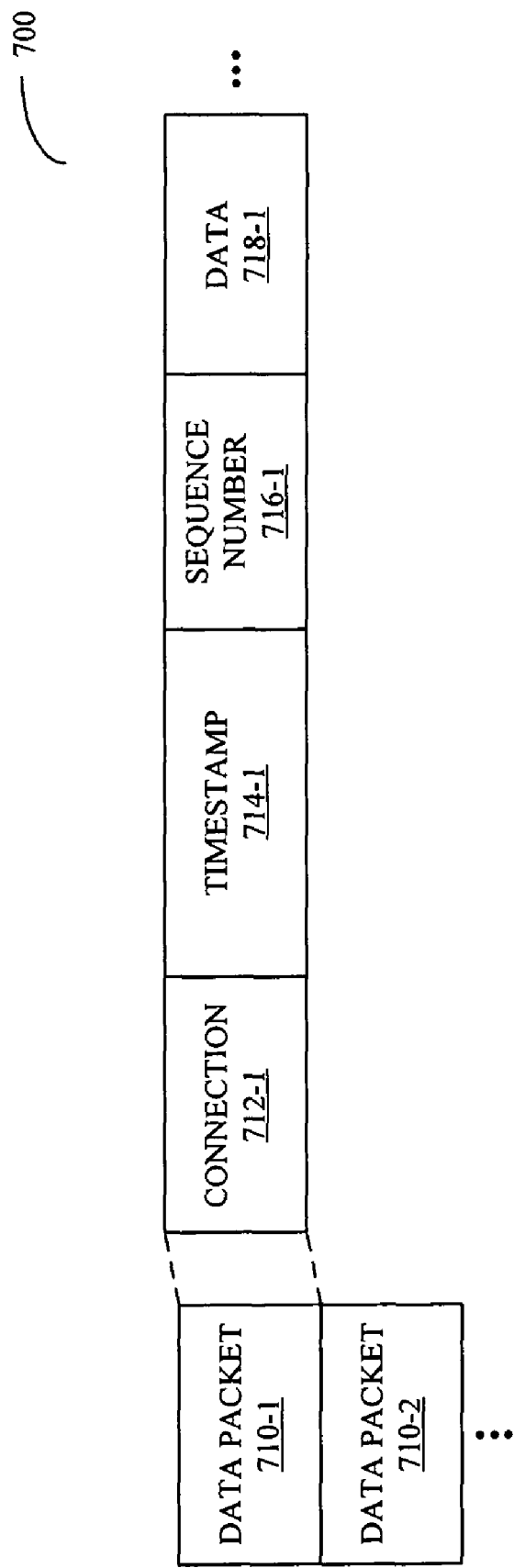
FIG. 7 is a block diagram illustrating a data structure in accordance with an embodiment of the present invention.

We now discuss data structures that may be used in the computer system 600. FIG. 7 presents a block diagram illustrating a data structure 700 in accordance with an embodiment of the present invention. This data structure may include information associated with one or more data packets 710. For example, the information for a data packet 710-1 may include a connection 712-1, a time stamp 714-1, a sequence number 716-1, and/or data 718-1. Note that that in some embodiments of the data structure 700 there may be fewer or additional components, two or more components may be combined into a single component, and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that queues and transmits data packets, comprising:

a queue configured to store data packets awaiting transmission;

a controller configured to dynamically determine an order in which the data packets are transmitted from the queue using Transmission Control Protocol (TCP) sequence numbers and/or TCP timestamps contained in the data packets in the queue, wherein while removing a data packet from the head of the queue in preparation for transmission, the controller is further configured to ensure that the packets are transmitted in the determined order by:

searching the queue for the data packet with an earliest sequence number belonging to a same TCP connection as the data packet at the head of the queue;

determining that the data packet with an earliest sequence number is not the data packet currently at the head of the queue; and swapping the data packet at the head of the queue with the earliest data packet, wherein swapping the data packets involves modifying a preference value associated with the packets to cause the earliest data packet to be processed before any other data packets for the same TCP connection; and a transmission mechanism configured to transmit the data packets from the queue in the determined order.

2. The apparatus of claim 1, wherein while ensuring that the packets are transmitted in the determined order, the controller is configured to use the TCP sequence numbers and/or TCP timestamps to ensure that if other data packets belonging to the same TCP connection are also in the queue at that time, then the data packet which is removed is the data packet that is earliest in sequence associated with the TCP connection.

3. The apparatus of claim 2, wherein the controller is configured to maintain relative fairness between different TCP connections by restricting data packet reordering to be performed only with respect to other data packets belonging to the same TCP connection, so that for any given set of data packets in the queue awaiting transmission, the order in which associated TCP connections will each transmit data packets remains unchanged, but during a turn for a given TCP connection, the data packet selected for transmission, from the data packets for the given TCP connection currently waiting in the queue, is the data packet that is earliest in the sequence for the given TCP connection.

4. The apparatus of claim 3, wherein while removing the data packet from the head of the queue in preparation for transmission, the controller is further configured to:

determine that the data packet with the earliest sequence number is the data packet currently at the head of the queue;

remove the data packet at the head of the queue; and cause the data packet to be transmitted.

5. The apparatus of claim 3, wherein searching the queue involves searching a linked list, a hash table, a heap, or other data structure so that the search is performed more efficiently than a simple linear search.

6. The apparatus of claim 3, wherein when a new data packet is to be inserted into the queue, the controller is configured to:

place the new data packet at the tail end of the queue, or as otherwise dictated by a queuing policy that is presently in effect;

search the queue, starting at the head, in order of expected transmission, and to examine each waiting data packet that belongs to the same TCP connection as the new data packet;

if another data packet is found that belongs to the same TCP connection as the new data packet but falls later in the sequence compared to the new data packet, to swap the data packet and the new data packet so that the data packet that falls later in the sequence now becomes the new data packet; and to continue searching from the current position in the queue, wherein after every data packet belonging to the same TCP connection as the new data packet has been examined, the insertion of the new data packet into the queue is complete.

7. The apparatus of claim 6, wherein searching the queue involves searching a linked list, a hash table, a heap, or other data structure so that the search is performed more efficiently than a simple linear search.

8. The apparatus of claim 6, wherein the new data packet is a retransmission of a previously dropped data packet.

9. The apparatus of claim 1, wherein the data packets in the queue are further reordered based on active queue management.

10. The apparatus of claim 1, wherein the data packets in the queue are further reordered based on weighted-fair queuing, queue reservations, or queue priority flags.

11. The apparatus of claim 1, wherein the process of dynamically determining the processing order of the data packets in the queue is performed recursively.

12. The method of claim 1, wherein modifying the preference value includes updating a preference value for each packet in the queue, but not sorting the actual packets in a memory in the queue.

13. A method for queuing and transmitting data packets, comprising:

queuing data packets awaiting transmission;

dynamically determining an order in which the data packets are transmitted from the queue using Transmission Control Protocol (TCP) sequence numbers and/or TCP timestamps contained in the data packets in the queue, wherein while removing a data packet from the head of the queue in preparation for transmission, the method further comprises ensuring that the packets are transmitted in the determined order by:

searching the queue for the data packet with an earliest sequence number belonging to the same a same TCP connection as the data packet at the head of the queue;

determining that the data packet with the earliest sequence number is not the data packet currently at the head of the queue; and swapping the data packet at the head of the queue with the earliest data packet, wherein swapping the data packets involves modifying a preference value associated with the packets to cause the earliest data packet to be processed before any other data packets for the same TCP connection; and transmitting data packets from the queue in the determined order.

14. The method of claim 13, wherein ensuring that the packets are transmitted in the determined order comprises using the TCP sequence numbers and/or TCP timestamps to ensure that if other data packets belonging to the same TCP connection are also in the queue at that time, then the data packet which is removed is the data packet that is earliest in sequence associated with the TCP connection.

15. The method of claim 14, wherein relative fairness between different TCP connections is maintained by restricting data packet reordering to be performed only with respect to other data packets belonging to the same TCP connection, so that for any given set of data packets in the queue awaiting transmission, the order in which associated TCP connections will each transmit data packets remains unchanged, but during a turn for a given TCP connection, the data packet that is selected for transmission, from the data packets for the given TCP connection currently waiting in the queue, is the data packet that is earliest in the sequence for the TCP connection.

16. The method of claim 15, wherein while removing the data packet from the head of the queue in preparation for transmission, the method involves:

determining that the data packet with the earliest sequence number is the data packet currently at the head of the queue;

removing the data packet at the head of the queue; and causing this data packet to be transmitted.

17. The method of claim 15, wherein searching the queue involves searching a linked list, a hash table, a heap, or other data structure so that the search is performed more efficiently than a simple linear search.

18. The method of claim 15, wherein when a new data packet is to be inserted into the queue, the method involves:
- placing the new data packet at the tail end of the queue, or as otherwise dictated by a queuing policy that is presently in effect;
- searching the queue, starting at the head, in order of expected transmission, and examining each waiting data packet that belongs to the same TCP connection as the new data packet;
- if another data packet is found that belongs to the same TCP connection as the new data packet but falls later in the sequence compared to the new data packet, swapping the data packet and the new data packet so that the data packet that falls later in the sequence now becomes the new data packet; and
- continuing to search from the current position in the queue, wherein after every data packet belonging to the same TCP connection as the new data packet has been examined, the insertion of the new data packet into the queue is complete.

19. The method of claim 18, wherein searching the queue involves searching a linked list, a hash table, a heap, or other data structure so that the search is performed more efficiently than a simple linear search.

20. A non-transitory computer-readable storage medium storing instructions that when executed by a computer cause the computer to perform a method, the method comprising:
- queuing data packets awaiting transmission;
- dynamically determining an order in which the data packets are transmitted from the queue using Transmission Control Protocol (TCP) sequence numbers and/or TCP timestamps contained in the data packets in the queue, wherein while removing a data packet from the head of the queue in preparation for transmission, the method further comprises ensuring that the packets are transmitted in the determined order by:
- searching the queue for the data packet with an earliest sequence number belonging to a same TCP connection as the data packet at the head of the queue;
- determining that the data packet with the earliest sequence number is not the data packet currently at the head of the queue; and
- swapping the data packet at the head of the queue with the earliest data packet, wherein swapping the data packets involves modifying a preference value associated with the packets to cause the earliest data packet to be processed before any other data packets for the same TCP connection; and
- transmitting data packets from the queue in the determined order.

* * * * *

UNITED STATES PATENT AND TRADEMARK OFFICE
CERTIFICATE OF CORRECTION

| | | |
|---|---|---|
| PATENT NO. | : 7,876,677 B2 | Page 1 of 1 |
| APPLICATION NO. | : 11/805503 | |
| DATED | : January 25, 2011 | |
| INVENTOR(S) | : Stuart D. Cheshire | |

It is certified that error appears in the above-identified patent and that said Letters Patent is hereby corrected as shown below:

In claim 13 (at column 12, line 28), please delete "the same" after "belonging to" so that the line reads: "sequence number belonging to a same TCP connection".

Signed and Sealed this
Nineteenth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,876,677 B2 | |
| APPLICATION NO. | : 11/805503 | |
| DATED | : January 25, 2011 | |
| INVENTOR(S) | : Stuart D. Cheshire | |

It is certified that error appears in the above-identified patent and that said Letters Patent is hereby corrected as shown below:

On the face page, in field (74), in "Attorney, Agent or Firm", in column 2, line 1, delete "Vaughn," and insert -- Vaughan, --, therefor.

Signed and Sealed this
Eighth Day of November, 2011

David J. Kappos
*Director of the United States Patent and Trademark Office*